United States Patent
Quantz

(10) Patent No.: US 6,205,915 B1
(45) Date of Patent: Mar. 27, 2001

(54) APPARATUS FOR CRACKING NUTS AT HIGH PRODUCTION RATES

(75) Inventor: James Bland Quantz, Lexington, SC (US)

(73) Assignee: Machine Design Incorporated, West Columbia, SC (US)

( * ) Notice: Subject to any disclaimer, the term of this patent is extended or adjusted under 35 U.S.C. 154(b) by 0 days.

(21) Appl. No.: 09/638,423

(22) Filed: Aug. 14, 2000

(51) Int. Cl.$^7$ ....................................................... A23N 5/00
(52) U.S. Cl. .................................. 99/571; 99/574; 99/581
(58) Field of Search ............................... 99/568, 571–576, 99/577–579, 580–583, 600; 426/481, 482; 30/120.1–120.5; 198/622

(56) References Cited

U.S. PATENT DOCUMENTS

| | | | |
|---|---|---|---|
| 3,871,275 | * 3/1975 | Quantz | .................................... 99/571 |
| 4,418,617 | 12/1983 | Quantz . | |
| 4,441,414 | 4/1984 | Quantz . | |
| 5,623,867 | 4/1997 | Quantz . | |

* cited by examiner

Primary Examiner—Timothy F. Simone
(74) Attorney, Agent, or Firm—Alston & Bird LLP

(57) ABSTRACT

A high production nutcracking apparatus wherein the nuts are fed from a hopper on a feed conveyor which has an upwardly inclined segment which passes through the hopper, a horizontal segment which leads to the cracking apparatus, and an arcuate transition juncture which is between the two segments. The nuts are singularized and oriented while being advanced on the feed conveyor, by means of a free floating covering plate which continuously overlies the feed conveyor from a point along the upwardly inclined segment, along the transition juncture, and to a delivery point where the nuts are lifted from the conveyor by a cracking apparatus. The cracking apparatus comprises a plurality of cracking units mounted on a rotatable turret, and the rotating cracking units are cyclically controlled so as to clampingly engage and lift each oriented nut from the advancing conveyor, and so as to preserve its orientation. Each nut is then cracked and thereafter released at separate spaced points along the circular path of travel of the cracking unit. The elevation of the feed conveyor relative to the cracking apparatus can be adjusted to accommodate nuts of different sizes.

19 Claims, 4 Drawing Sheets

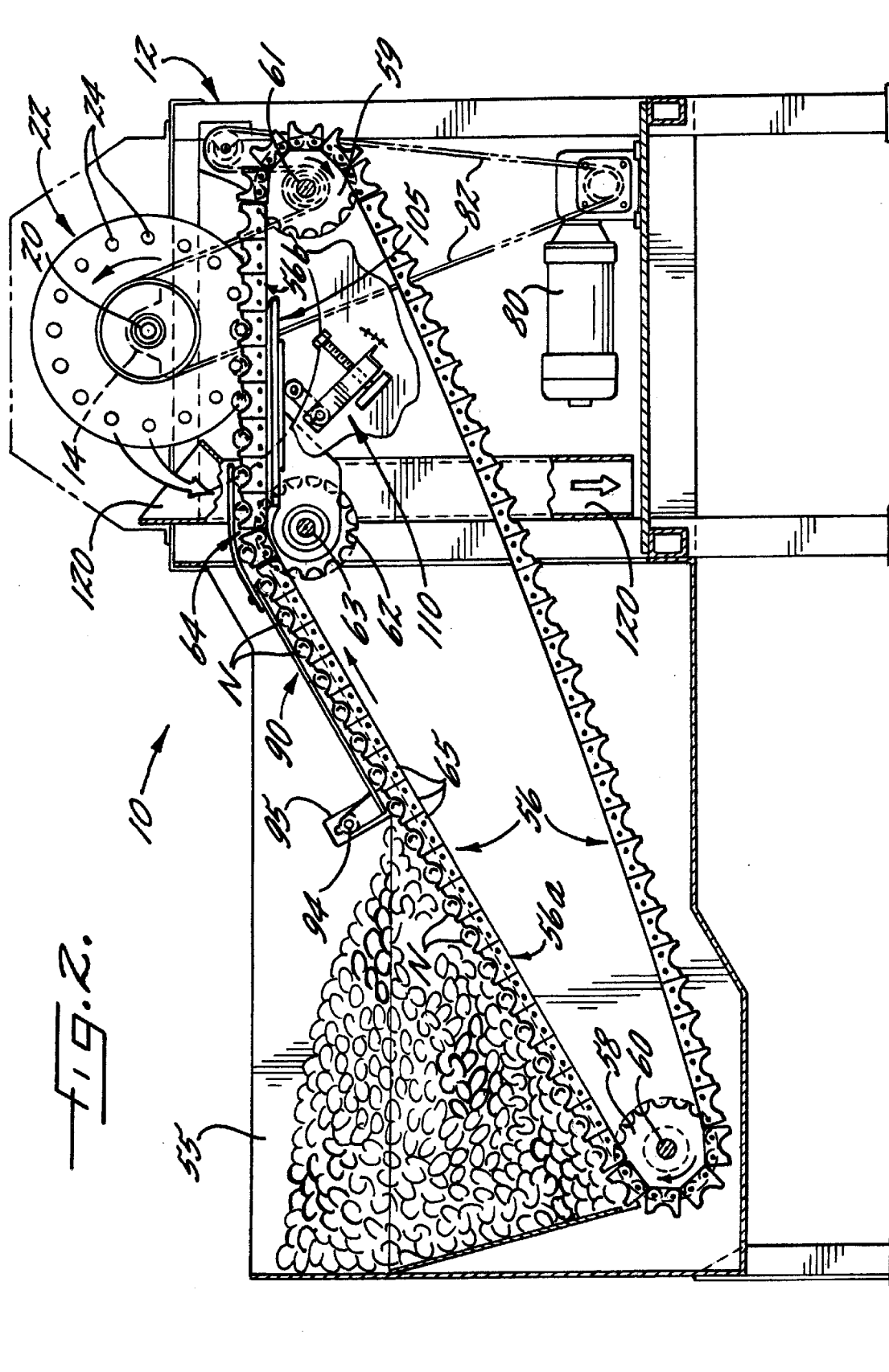

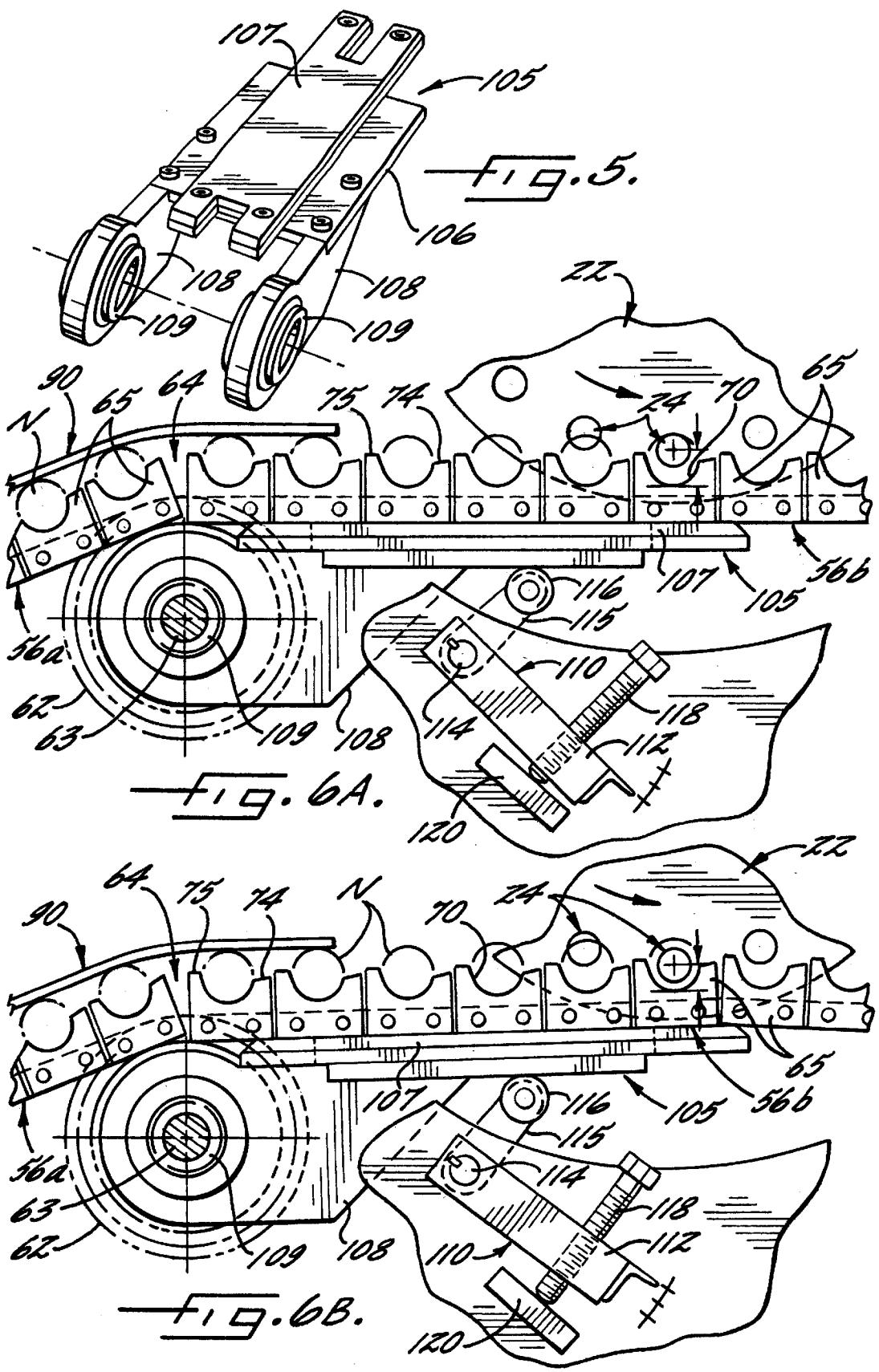

APPARATUS FOR CRACKING NUTS AT HIGH PRODUCTION RATES

BACKGROUND OF THE INVENTION

The present invention relates to an improved apparatus for cracking nuts at high production rates.

In prior U.S. Pat. No. 4,418,617, there is disclosed a high production nutcracking apparatus wherein a plurality of cracking units are arranged on a rotatable turret, with each cracking unit having an opening adapted to receive an individual nut from a feed conveyor. Each cracking unit includes a mechanism for then cracking the nut as the turret continues to rotate, which is actuated by a pneumatic control system.

The feed conveyor as disclosed in the '617 patent includes a feed chain which comprises a plurality of nut transport elements which are mounted in succession, and with each nut transport element having an upwardly open receptacle for receiving an individual nut as it advances through a feed hopper. The feed chain extends in an upwardly inclined direction through the feed hopper and it is designed to feed the nuts from the hopper at a relatively high speed to the cracking units, while effectively orienting the nuts in the respective receptacles so that they may be engaged by the cracking units in an end to end orientation.

U.S. Pat. No. 5,623,867 discloses an improved nutcracking apparatus wherein the feed conveyor has an upper run which includes an upwardly inclined segment extending through the lower portion of the hopper and a horizontal segment extending from the upwardly inclined segment to the delivery or pick up point. To singulate and orient the nuts in the receptacle, there is provided a deflecting plate which overlies a portion of the upwardly inclined segment, and a brush located just downstream of the transition juncture to the horizontal segment.

When a machine as described in the '867 patent is run at very high speeds, such as 800 nuts per minute, the nuts tend to fly up from the transport elements, particularly at the arcuate transition juncture between the upwardly inclined segment and the horizontal segment. Also, the nuts tend to bounce during their transport, which upsets their orientation. The plate and brush as disclosed in the '867 patent have not proven to be satisfactory in consistently avoiding these problems.

A further limiting feature associated with the prior machine disclosed in the '867 patent, is the fact that the machine is not easily adaptable to accommodate nuts of differing sizes. Pecans, for example, vary significantly in size, and they are typically run through a sizing machine prior to cracking so as to separate the nuts into different grades. The machine of the prior patent is designed so that when the transport elements reach the pick up location, the sizing piston enters one end of the receptacle and moves the nut into engagement with an anvil at the other end of the receptacle. To properly grip the nut, it is important that the elevation of the sizing piston and anvil be aligned with the centerline of the nut. However, this does not always occur, since with pecans of small size, the sizing piston and anvil may be above the nut centerline, and in the case of large pecans they may be below the centerline. The prior machine has no easy way to accommodate these differences.

It is accordingly an object of the present invention to provide a high speed nutcracking apparatus which has a nut delivery system which is able to singulate and orient the nuts as they are removed from a hopper, and which is able to maintain their orientation until they are picked up by a cracking cylinder.

It is another object of the present invention to permit the nutcracking apparatus to be readily adjusted to accommodate nuts of differing sizes.

SUMMARY OF THE INVENTION

These and other objects and advantages of the present invention are achieved in the embodiment illustrated herein by the provision of a nut feeding apparatus which comprises a hopper for storing a relatively large quantity of the nuts to be cracked, and an endless conveyor which has an upper run extending through the hopper to a delivery point exteriorly thereof. The conveyor includes a feed chain and a plurality of nut transport elements mounted in succession on the feed chain. Each element includes opposite sides and a generally semi-circular, laterally extending receptacle which faces upwardly during movement of the element through the hopper and to the delivery point, and each receptacle is sized to supportingly receive a single nut to be cracked and which is oriented with its end to end direction extending along the receptacle.

The upper run of the endless conveyor includes an upwardly inclined segment extending through the lower portion of the hopper and a substantially horizontal segment extending from the upwardly inclined segment to the delivery point, and the upwardly inclined segment and the horizontal segment define an arcuate transition juncture therebetween. By thus dividing the path of travel of the upper run into upwardly inclined and horizontal segments, the length of the conveyor in the hopper can be increased, which in turn permits an increased operating speed.

A drive system is provided for rotating the endless conveyor such that the nut transport elements move in succession through the hopper and to the delivery point, and a singularizing and orienting plate is positioned so as to continuously overlie the path of the nut transport elements from a point along the upwardly inclined segment, along the transition juncture, and to a point immediately upstream of the delivery point. Also, the plate is mounted by means of a horizontal pivotal connection adjacent the upstream end of the plate such that the plate may be lifted upwardly from the elements. Preferably, the forward edge of the plate extends diagonally across the path of the transport elements for orienting each nut received in the receptacles with its end to end direction extending along the associated receptacle. Also, the fact that the plate extends continuously over the transition juncture and to the delivery point has been found to maintain the orientation of the nuts as they change their direction while moving across the transition juncture. The plate also prevents bouncing of the nuts, which can also result in their misalignment.

The advancing oriented nuts are clampingly engaged in succession at the delivery point of the endless conveyor by respective cracking units mounted on a rotating turret, and so as to preserve the orientation of the nuts. The nuts are thereby withdrawn from a first path of travel which is defined by the conveyor and are thereafter conveyed along a curvilinear second path of travel, i.e., the circular path resulting from the rotation of the turret. A cracking force is applied to each nut at a point along the second path of travel downstream of the point at which the nuts are withdrawn from the first path of travel, and the cracked nuts continue to be held in the cracking units, until a predetermined release point along the second path of travel is reached.

As a further aspect of the invention, a support plate is positioned to underlie and support the nut transport elements as they advance across the delivery point, and the support plate is pivotally mounted so as to be selectively moveable toward and away from the rotating turret. Thus the elevation of the path of travel of the nut transport elements with respect to the cracking units of the turret can be adjusted, to insure that the nuts are gripped along their centerlines and thus accommodate nuts of different sizes.

BRIEF DESCRIPTION OF THE DRAWINGS

Some of the objects and advantages of the invention having been stated, others will appear as the description proceeds, when taken in connection with the accompanying drawings, in which:

FIG. 2 is a sectional side elevation view of the apparatus, taken substantially along the line 2—2 of FIG. 1;

FIG. 5 is a perspective view of the support plate and its mounting framework;

FIG. 6A is a fragmentary sectional side elevation view illustrating the support plate for the endless conveyor in its lowered position for accommodating nuts of relatively large size;

FIG. 6B is similar to FIG. 6A but showing the support plate in its raised position for accommodating smaller nuts.

DETAILED DESCRIPTION OF THE PREFERRED EMBODIMENTS

Figure 1:
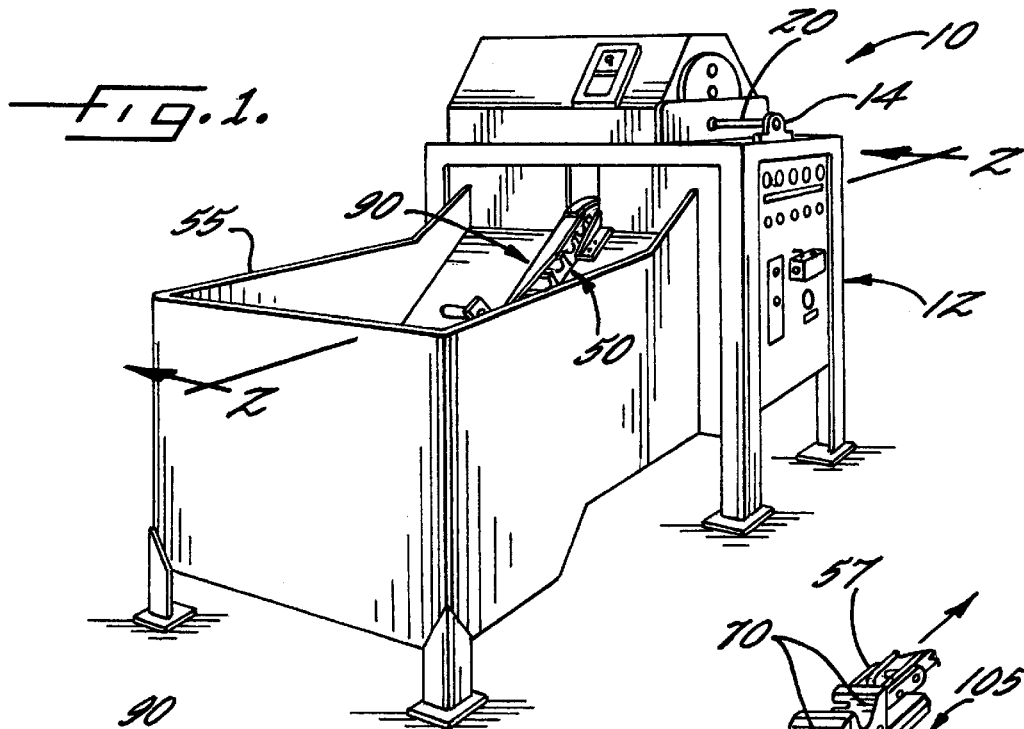
FIG. 1 is a perspective view of a nutcracking apparatus which embodies the features of the present invention.

Referring more specifically to the drawings, a nutcracking apparatus embodying the features of the present invention is illustrated generally at 10 in FIG. 1. The apparatus includes a rectangular box-like frame 12 which supports a pair of bearing blocks 14 (only one being visible in FIG. 1) which rotatably mount a central shaft 20 which defines a horizontal central axis.

Figure 7:
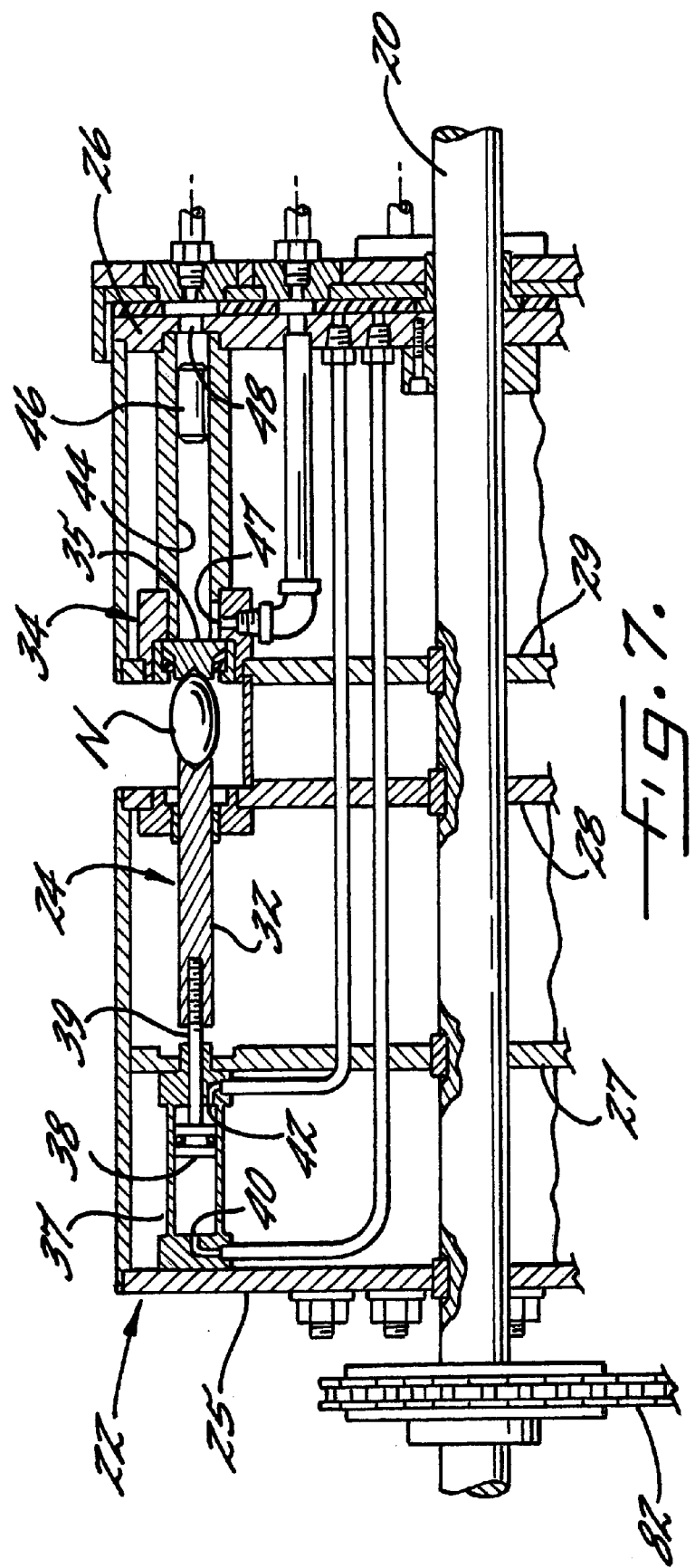
FIG. 7 is a fragmentary sectional view of the upper portion of the turret, and illustrating one of the cracking units.

As best seen in FIG. 7, a turret 22 is fixedly mounted to the shaft 20 so as to be rotatable with the shaft about the central axis. The turret 22 comprises a plurality of elongate cracking units 24 which are circularly arranged about the shaft and supported by the end plates 25 and 26, and the intermediate plates 27, 28 and 29. There are sixteen cracking units in the illustrated embodiment and the units extend generally parallel to each other and to the central axis.

Each of the cracking units 24 comprises an anvil 32, a cracking die assembly 34 which includes a cracking die 35. The anvil and cracking die assembly are mounted in an axially aligned, opposed relationship to define an opening for receiving a nut N therebetween. More particularly, the means for mounting the anvil 32 includes a first air cylinder 37, a piston 38 slidably disposed within the cylinder 37, a piston rod 39 interconnecting the piston and anvil, a first air port 40 disposed adjacent the rearward end of the cylinder, and a second air port 42 disposed adjacent the forward end of the cylinder. As will be apparent, movement of the piston 38 results in a corresponding movement of the anvil 32, either forwardly toward the cracking die assembly 34 or rearwardly therefrom. Such movement is controlled by air which is selectively provided to the first and second ports 40, 42 in a manner more fully disclosed in U.S. Pat. Nos. 4,418,617 and 4,441,414, the disclosures of which are expressly incorporated herein by reference.

The cracking die assembly 34 is more fully described in the above referenced '414 patent, and in copending U.S. Pat. application Ser. No. 09/592,245, filed Jun. 13, 2000, and it includes the cracking die 35, and a second air cylinder 44. A free floating shuttle 46 is mounted within the cylinder 44. In addition, there is provided an air port 47 adjacent the forward end of the cylinder and a further port 48 which extends axially through the rearward end of the cylinder.

The control system for cyclically actuating the cracking unit includes an air control system whereby air is selectively introduced into the four ports 40, 42, 47, and 48. More particularly, upon receiving a nut N in the opening between the anvil 32 and cracking die assembly 34, air is first introduced into the port 40 so that the piston 38 and anvil 32 are moved forwardly and such that the anvil 32 operatively engages one end of the nut N in the opening. The nut thereby becomes supported between the anvil 32 and cracking die 35. The anvil 32 and cracking die 35 thereby also serve to compressively stress the retained nut. High pressure air is next injected through the port 48 and into the air cylinder 44, such that the shuttle 46 is thrust forwardly along the cylinder and impacts against the rear end surface of the cracking die 35, causing the cracking die to sharply advance a short distance forwardly against the nut and thereby crack its shell. The air in front of the advancing shuttle is permitted to exhaust through the port 47. Air next enters the port 42, causing the piston 38 and anvil 32 to move rearwardly and release the nut, and as a final step, air is caused to enter the port 47 and thereby return the shuttle 46 to its rearward position. The apparatus is then in position to receive another nut to be cracked, with the above cycle being cyclically repeated. Further details regarding the air control system for cyclically actuating the apparatus 10 may be obtained from the above noted prior patents.

The apparatus of the present invention further includes an apparatus 50 for advancing and delivering a plurality of nuts individually in succession along a path of travel to the rotating turret 22. This nut delivering apparatus includes a hopper 55 for storing a relatively large quantity of the nuts to be cracked, and an endless feed conveyor 56 which includes a feed chain 57 (FIG. 3) and a pair of supporting sprockets 58, 59 mounted respectively on the shafts 60, 61, which support the feed chain. Also, there is provided an intermediate supporting sprocket 62 mounted on the shaft 63 as further described below.

The conveyor 56 is mounted for movement about the sprockets 58, 59, and includes an upper run which extends through the lower portion of the hopper 55 and along an upwardly inclined path of travel to a delivery point adjacent the bottom dead center position of the turret 22. More particularly, the upper run of the endless conveyor includes an upwardly inclined segment 56a extending through the lower portion of the hopper, and a substantially horizontal segment 56b extending from the upwardly inclined segment to a delivery point which is tangentially aligned along the bottom dead center position of the cracking units 24. The upwardly inclined segment 56a and the horizontal segment 56b define a transition juncture 64 therebetween and which is also defined by the supporting sprocket 63. More particularly, the transition juncture 64 is arcuately curved in accordance with the circumferential curvature of the supporting sprocket 63.

Figure 4:
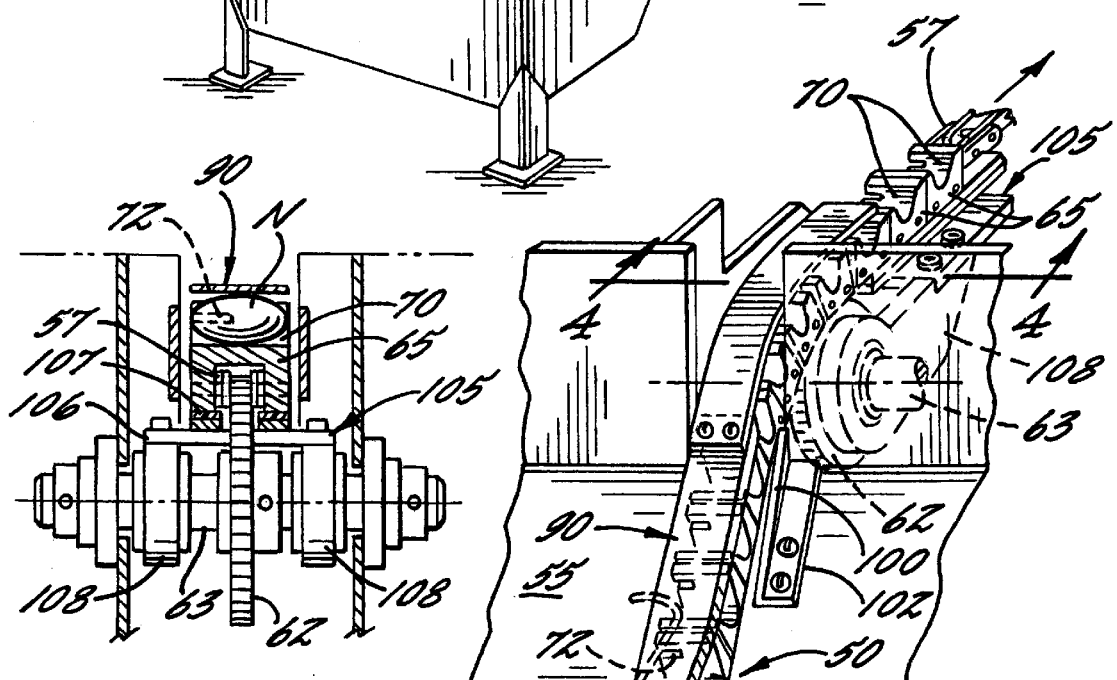
FIG. 4 is a fragmentary sectional elevation view taken substantially along the line 4—4 of FIG. 3.
Figure 3:
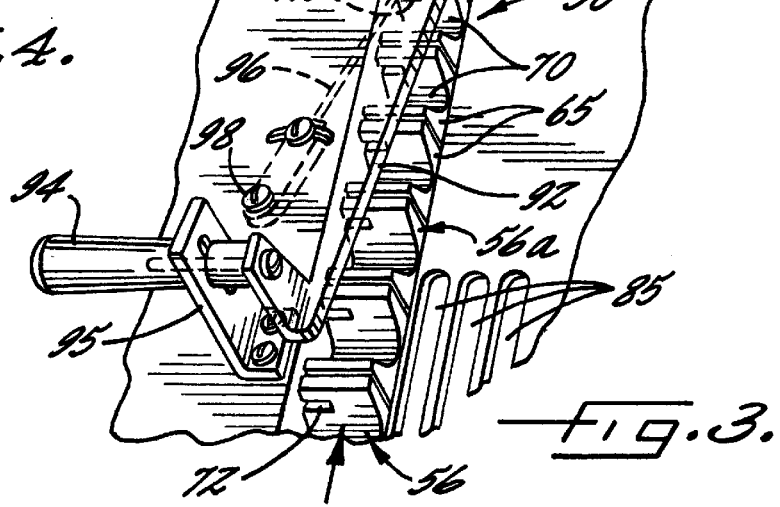
FIG. 3 is a fragmentary perspective view of the singularizing and orienting means of the present invention.

A plurality of block-like nut transport elements 65 are mounted in succession along the feed chain 57. As best seen in FIGS. 3 and 4, and as further illustrated in U.S. Pat. No. 5,623,867, each element 65 includes parallel opposite sides, parallel opposite ends, and top and bottom faces (not numbered). A generally semi-cylindrical receptacle 70 extends laterally across the upper face of the element, and so as to communicate with both sides thereof. By design, each receptacle 70 is sized to supportingly receive a single nut to be cracked which is oriented with its end to end direction extending axially along the receptacle. Each element 65 further includes a longitudinally channel in the bottom face for receiving the feed chain 57, and a pair of transverse pins (shown in dashed lines in FIG. 4) for interconnecting the element to the chain. Further, each element 65 includes a slot 72 which extends longitudinally along the full length of the left side as seen in FIG. 3, and which is disposed parallel to the bottom face of the element. The slot 72 extends laterally a portion of the distance across the element, and communicates with the receptacle 70. The portion 74 of the top face forwardly of receptacle may be inclined downwardly, so that the portion 75 rearwardly of the receptacle in effect protrudes upwardly so as to catch the nuts in the hopper and knock them into the receptacle.

The conveyor 56 is powered by the motor 80 and drive chain 82, which drives the sprocket 59 and which also drives the turret 22 in the manner seen in FIG. 2, and such that the transport elements and thus the nuts move from the hopper tangentially past the circle defined by the rotating cracking units 24, at a speed corresponding to such rotational speed. Also, the common drive 80, 82 permits the movements of the feed conveyor 56 and the turret 22 to be coordinated so that at the delivery point each of the cracking units 24 is aligned with a respective one of the nut transport elements 65, with the anvil and cracking die thereof being disposed on opposite sides of the nut transport element and aligned with the receptacle 70.

A rectangular channel (note FIG. 3) is formed in the bottom wall of the hopper 55 and which serves to partially receive and guide the nut transport elements 65 of the conveyor. A further description of the channel may be found in the above referenced patents. Also, the bottom wall of the hopper may include slots 85 for permitting the removal of shell fragments and other debris.

The hopper 55 includes singularizing and orienting means to ensure that any nuts in excess of one are removed from the receptacle 70 of each nut transport element 65, and that each nut is oriented with its end to end direction extending axially along the receptacle 70. This singularizing and orienting means includes a deflecting plate 90 which is designed for laterally deflecting the upper portion of any upstanding nuts disposed in each receptacle toward the right side of the element as seen in FIG. 3, as the element moves through the hopper, to thereby laterally orient the nuts. The plate 90 has a forward edge 92, and a length sufficient to continuously overlie the path of the nut transport elements from a point along the upwardly inclined segment, along the transition juncture, and to a point immediately upstream of the delivery point. In addition, the plate 90 is mounted in the hopper so that the forward edge 92 extends diagonally across the path of the elements. The plate 90 is pivotally connected adjacent its upstream end for pivotal movement about a horizontal axis defined by the anchoring pin 94, and such that the plate may be lifted upwardly from the elements 65 in the event a foreign object, such as a rock, enters the hopper and moves between the elements 65 and the plate 90. The pin 94 is in turn mounted to the bracket 95 so as to permit its elevation to be adjusted, and thus permit the elevation of the upstream end of the plate 90 to be adjusted.

The singularizing and orienting means of the apparatus further includes means for laterally ejecting any laterally oriented nuts in excess of one for each receptacle. This ejecting means comprises an arm 96, which is mounted in the hopper so that the arm extends a predetermined lateral distance into the slot 72 of each advancing element, to thereby deflect each nut therein which is adjacent the left side and so that it moves toward the right side. The arm 96 is mounted for pivotal adjustment about the mounting pin 98, and is typically positioned to extend into the slot 72 so that the distance between the innermost portion of the arm and the right side corresponds to the average length of the nut being processed. Thus in the event two relatively small nuts are positioned in any receptacle in end to end alignment, the arm will serve to eject the one closest to the right side. It will also be noted from FIG. 3 that the elongate deflecting plate 90 overlies the operative portion of the ejecting arm 96, and thus serves to prevent nuts from lifting upwardly from the associated receptacle upon being contacted by the arm.

The hopper 55 also mounts an upwardly inclined guide surface 100 which is positioned on the support member 102 along the right side of the elements 65, and downstream of the deflecting edge 92 of the plate 90 and the ejecting arm 96. The guide surface 100 is positioned so as to contact that portion of any nut extending laterally from its supporting receptacle 70 on the right side, and acts to move the nut back into the receptacle.

As will be apparent, when the apparatus is operating at high speed, the nuts will tend to lift completely out of the receptacles when passing over the transition juncture 64, by reason of their upward inertia. The plate serves to limit such upward lifting, and the plate also eliminates the bouncing of the nuts as they rapidly move toward the delivery point, so as to maintain their orientation in the receptacles of the nut transport elements.

As the nut transport elements advance along the horizontal segment toward and under the delivery point, they are supported by a support plate 105 which is adjustable in elevation with respect to the cracking units in the turret. More particularly, and as best seen in FIG. 5, the support plate 105 comprises a generally horizontal platform 106 which mounts a wear resistant pad 107 of Teflon® or the like, and the platform is connected to two support arms 108 which mount aligned bearings 109, which are in turn mounted on the shaft 63 so as to permit rotation about the axis of the shaft. In order to control the pivotal movement of the support plate, there is provided an actuating element 110 which is composed of a lower arm 112 which is rotatable about the shaft 114 and which fixidly mounts an extension 115 which includes a roller 116 which is positioned to underlie and support the support plate 105. Pivotal movement of the actuating element 110 is controlled by a threaded member 118 which extends through a threaded opening in the lever arm 112 and engages a fixed pad 120. Thus upon rotation of the threaded member 118, the actuating element 110 can be rotated to raise and lower the support plate 105 at the delivery point. By this arrangement, the elevation of the receptacles 70 which move past the delivery point can be adjusted so as to accommodate nuts of different sizes. In other words, the elevation of the nut transport elements with respect to the axis along which the anvil and cracking die move, can be adjusted to accurately conform to the centerline of the size of the nuts being cracked.

FIG. 6A shows the actuating element 110 moved to its lower position so that the conveyor is lowered to accommodate nuts of relatively large size, and FIG. 6B shows the actuating element 110 raised to raise the conveyor and accommodate nuts of smaller size.

To describe the operation of the apparatus in more detail, it will be understood that the motor 80 acts to rotate the turret 22 about the central axis of the shaft 20, and to advance the conveyor 56 so that the upper run moves toward the turret at a speed corresponding to the rotational speed of the cracking units 24. The nut transport elements 65 thereby move in succession through the hopper 55, and the nuts therein are received in the receptacles 70, and singularized and oriented by contact with the plate 90, and arm 96, in the manner described above. The nuts are thereby effectively individually received in the respective receptacles 70, and oriented with their end to end direction being disposed horizontally and perpendicular to the direction of movement of the upper run of the conveyor.

By design, the nuts are moved in succession to the openings between the anvil 32 and cracking die assembly 34 of a cracking unit 24 as the cracking unit passes a nut delivery or loading point, which is located at about the bottom dead center of the circle defined by the rotating cracking units. By adjustment of the elevation of the support plate 105, the centerline of the nuts being processed can be accurately aligned with the axis along which the anvil and cracking die are moved. At this point, pressurized air is directed to the first port 40 of the cracking unit. The piston 38 and anvil 32 are thereby moved forwardly, and such that the anvil operatively engages one end of the nut N in the opening, and with the force acting through the nut to clampingly engage and retain the nut in an end to end alignment between the anvil 32 and the cracking die 35 of the die assembly 34. The nut is thereby lifted from its receptacle on the feed conveyor 56. The frictional contact between the piston 38 and the walls of the air cylinder 37 serve to maintain the forward axial position of the anvil during rotational movement of the cracking unit upwardly and away from the conveyor.

The nut is then advanced along a curvilinear path of travel, i.e., the circle defined by the rotating cracking units 24, and to a nut stressing location, which is located about 60 degrees beyond the bottom dead center. At this location, air again enters the first port 40 to compressively stress the retained nut. Immediately thereafter, high pressure air is injected into the port 48 of the air cylinder 44, such that the shuttle 46 is thrust forwardly along the cylinder 44 and impacts against the rear side of the cracking die 35, causing the cracking die to sharply advance a short distance forwardly and thereby crack the nut. The air in front of the advancing shuttle exhausts through the port 47, which is of relatively large diameter to accommodate the entering air without an undue build-up of pressure. Most of the loose shell fragments resulting from the cracking operation are drawn off through a housing by a vacuum line (not shown). Further, the cracking operation preferably occurs while the nut remains under compressive stress.

The cracked nut remains supported between the anvil and cracking die after the cracking operation, and is carried to a release point, which is preferably positioned at about 45 degrees beyond the top dead center position of the turret. At this point, air enters the second port 42, and the piston and anvil are moved rearwardly. The released nut then falls to the laterally directed discharged chute 120 (FIG. 2).

As the final step, air is caused to enter the port 47, and the shuttle 46 to return to its rearward position. The cycle may then be repeated as the cracking units move through the loading position to receive another nut from an aligned receptacle.

In the drawings and specification, there has been set forth a preferred embodiment of the invention, and although specific terms are employed, they are used in a generic and descriptive sense only and not for purposes of limitation.

That which is claimed:

1. An apparatus for successively delivering nuts in a predetermined orientation to a cracking head of a nutcracker, and comprising a hopper for storing a relatively large quantity of the nuts to be cracked, an endless conveyor having an upper run extending through said hopper to a delivery point exteriorly thereof, with said conveyor comprising a feed chain and a plurality of nut transport elements mounted in succession on said feed chain, with each element including opposite sides and a generally semicircular, laterally extending receptacle which faces upwardly during movement of the element through said hopper and to said delivery point, and with each receptacle being sized to supportingly receive a single nut to be cracked which is orientated with its end to end direction extending along the receptacle, said upper run of said endless conveyor including an upwardly inclined segment extending through the lower portion of said hopper and a substantially horizontal segment extending from said upwardly inclined segment to said delivery point, and with the upwardly inclined segment and the horizontal segment defining an arcuate transition juncture therebetween, a drive for rotating said endless conveyor such that said nut transport elements move in succession through said hopper and to said delivery point, and a plate positioned so as to continuously overlie the path of the nut transport elements from a point along said upwardly inclined segment, along said transition juncture, and to a point immediately upstream of said delivery point, and with said plate being mounted such that the plate may be lifted upwardly from the elements.

2. The apparatus as defined in claim 1 wherein said plate is mounted by means of a horizontal pivotal connection adjacent the upstream end of the plate.

3. The apparatus as defined in claim 2 wherein said endless conveyor further comprises a supporting sprocket mounted below said transition juncture and so that the transition juncture is arcuately curved in accordance with the circumferential curvature of said supporting sprocket.

4. The apparatus as defined in claim 3 wherein said plate includes a forward edge which extends diagonally across the path of travel of the transport elements for orienting each nut received in the receptacles with its end to end direction extending along the associated receptacle.

5. The apparatus as defined in claim 4 wherein the receptacle of each nut transport element communicates with each of said opposite sides of the associated element, and wherein said apparatus further comprises means for laterally ejecting any nuts in excess of one from one of said sides of each receptacle.

6. The apparatus as defined in claim 5 wherein each nut transport element includes a longitudinal slot communicating with the full length of the side of the element opposite said one side, as well as with the associated receptacle, and with said slot extending laterally a substantial portion of the distance across the element, and wherein said ejecting means comprises an arm, and means mounting said arm in said hopper so that the arm extends a predetermined lateral distance into the slot of each advancing element and thereby deflects each nut therein toward said one side.

7. The apparatus as defined in claim 1 further comprising
means for lifting the advancing nuts in succession from the nut transport elements at the delivery point and advancing the removed nuts in succession from the delivery point along a generally curvilinear path of travel, and including means for clampingly engaging each nut during its removal from the associated nut transport element and advance along the curvilinear path of travel so as to preserve the predetermined end to end orientation of each nut, and means for imparting a cracking force to each nut while being advanced along the curvilinear path of travel, and with the cracking force being applied in a direction corresponding to the end to end clamping engagement of the nut.

8. The apparatus as defined in claim 7 wherein the means for lifting and advancing the nuts comprises a turret mounted for rotation about a central axis which is perpendicular to and above the upper run of the endless conveyor means at the delivery point, a drive for rotating the turret about the central axis, a plurality of cracking units mounted to said turret so as to extend parallel to each other and to said central axis, with each of said cracking units comprising an anvil and a cracking die mounted so as to be moveable toward and away from each other.

9. The apparatus as defined in claim 8 wherein the drive for rotating the turret is interconnected with the drive for rotating the endless conveyor so that at the delivery point each of the cracking units is aligned with a respective one of the nut transport elements, with the anvil and cracking die thereof being disposed on opposite sides of the nut transport element.

10. The apparatus as defined in claim 9 wherein the means for lifting and advancing the nuts further comprises means for axially moving the anvil into the receptacle of the associated nut transport element as the element moves past the delivery point so as to engage and grip a nut located in the receptacle of the element between the anvil and the cracking die, and said means for imparting a cracking force includes a free floating shuttle mounted for movement away from and then into impacting engagement with the cracking die so as to crack a nut which is retained between the anvil and the cracking die.

11. A high production nutcracking apparatus comprising, means for advancing a plurality of nuts individually in succession along a first path of travel with at least substantially all of the advancing nuts being disposed in a predetermined orientation, means for lifting the advancing nuts in succession from the first path of travel at a delivery point and advancing the removed nuts in succession from the delivery point along a generally curvilinear second path of travel, and including means for clampingly engaging each nut during its removal from the first path of travel and advance along the second path of travel so as to preserve the predetermined orientation of each nut, and means for imparting a cracking force to each nut while being advanced along the second path of travel, and with the cracking force being applied in a direction corresponding to the clamping engagement of the nut, said means for advancing nuts along the first path of travel including means for adjusting the elevation of the first path of travel with respect to the lifting means at the delivery point, and so as to accommodate nuts of different sizes.

12. The apparatus as defined in claim 11 wherein said means for advancing nuts along a first path of travel includes a hopper for storing a relatively large quantity of the nuts to be cracked, an endless conveyor having an upper run extending through said hopper to the delivery point, with said conveyor comprising a feed chain and a plurality of nut transport elements mounted in succession on said feed chain, and a drive for rotating said endless conveyor such that said nut transport elements move in succession through said hopper and to said delivery point, and said means for adjusting the elevation of the first path of travel comprises a support plate positioned to underlie and support the nut transport elements as they advance across the delivery point, with said support plate being pivotally mounted so as to be selectively moveable toward and away from said lifting means.

13. The apparatus as defined in claim 12 wherein said endless conveyor further comprises plurality of sprockets about which the feed chain is entrained, with the sprockets being positioned so that the upper run extends a substantial distance beyond the delivery point.

14. The apparatus as defined in claim 13 wherein each nut transport element includes opposite sides and a generally semicircular, laterally extending receptacle which faces upwardly during movement of the element through said hopper and to said delivery point, and with each receptacle being sized to supportingly receive a single nut to be cracked which is oriented with its end to end direction extending along the receptacle.

15. The apparatus as defined in claim 14 wherein said upper run of said endless conveyor includes an upwardly inclined segment extending through the lower portion of said hopper and a substantially horizontal segment extending from said upwardly inclined segment to a point beyond said delivery point, and with the upwardly inclined segment and the horizontal segment defining an arcuate transition juncture therebetween.

16. The apparatus as defined in claim 15 further comprising a plate positioned so as to continuously overlie the path of the nut transport elements from a point along said upwardly inclined segment, along said transition juncture, and to a point immediately upstream of said delivery point, and with said plate being mounted by means of a horizontal pivotal connection adjacent the upstream end of the plate such that the plate may be lifted upwardly from the elements.

17. The apparatus as defined in claim 15 wherein the means for lifting and advancing the nuts comprises a turret mounted for rotation about a central axis which is perpendicular to and above the upper run of the endless conveyor means at the delivery point, a drive for rotating the turret about the central axis, and a plurality of cracking units mounted to said turret so as to extend parallel to each other and to said central axis, with each of said cracking units comprising an anvil and a cracking die mounted so as to be moveable toward and away from each other.

18. The apparatus as defined in claim 17 wherein the drive for rotating the turret is interconnected with the drive for rotating the endless conveyor so that at the delivery point each of the cracking units is aligned with a respective one of the nut transport elements with the anvil and cracking die disposed on opposite sides of the nut transport element.

19. The apparatus as defined in claim 18 wherein the means for lifting and advancing the nuts further comprises means for axially moving the anvil into the receptacle of the nut associated transport element as the element moves past the delivery point so as to engage and grip a nut located in the receptacle of the element between the anvil and the cracking die, and said means for imparting a cracking force includes a free floating shuttle mounted for movement away from and then into impacting engagement with the cracking die so as to crack a nut which is retained between the anvil and the cracking die.

* * * * *